Jan. 29, 1963  K. WILFERT  3,075,803
SLIDABLE DOOR IN MOTOR VEHICLES
Filed Aug. 10, 1959  4 Sheets-Sheet 1
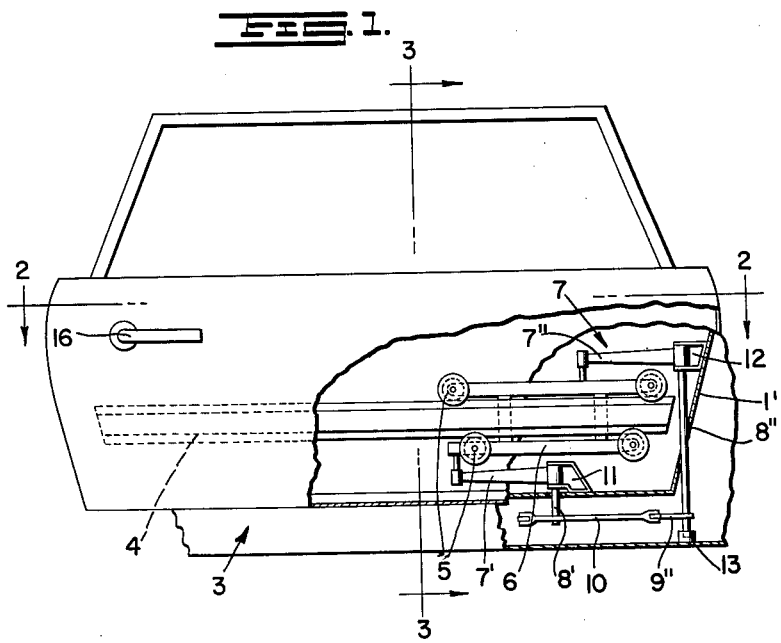
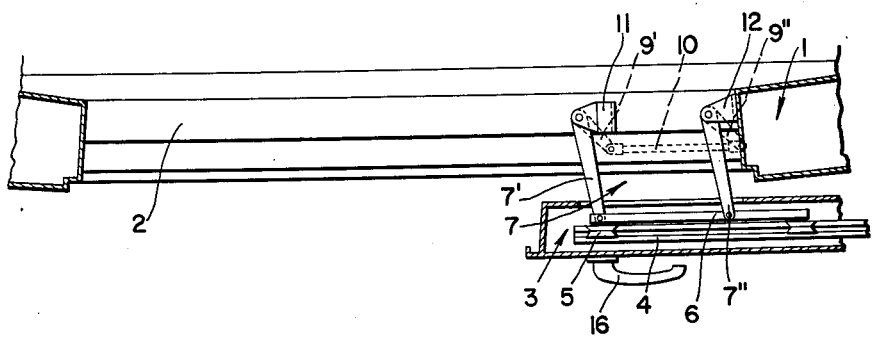
INVENTOR
KARL WILFERT
BY Dicke, Craig and Freudenberg
ATTORNEYS

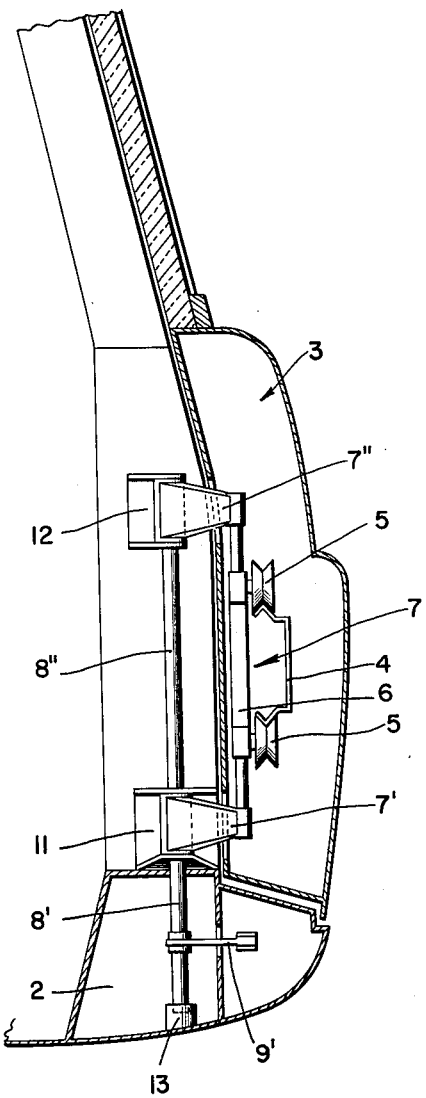

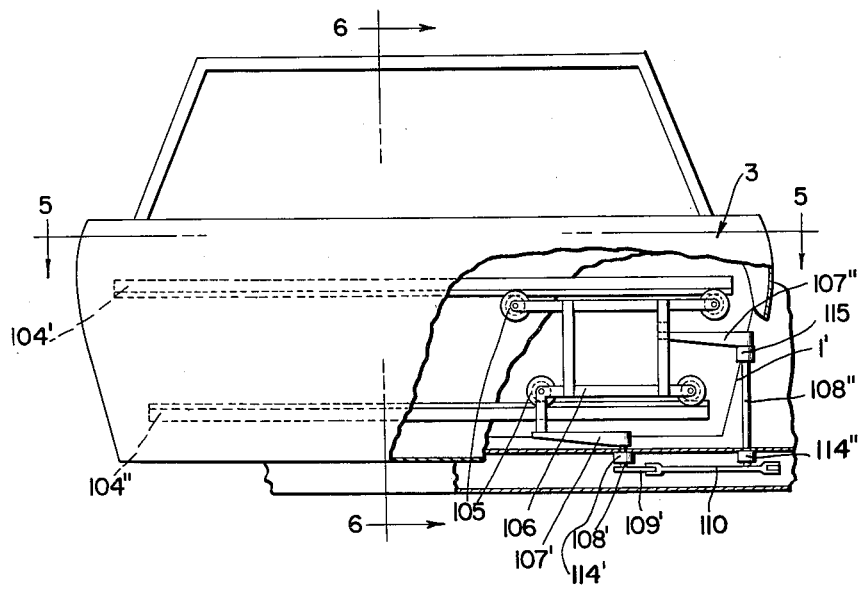
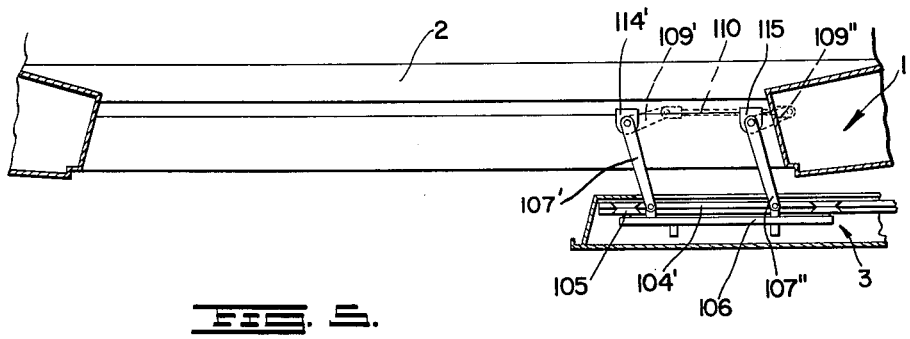

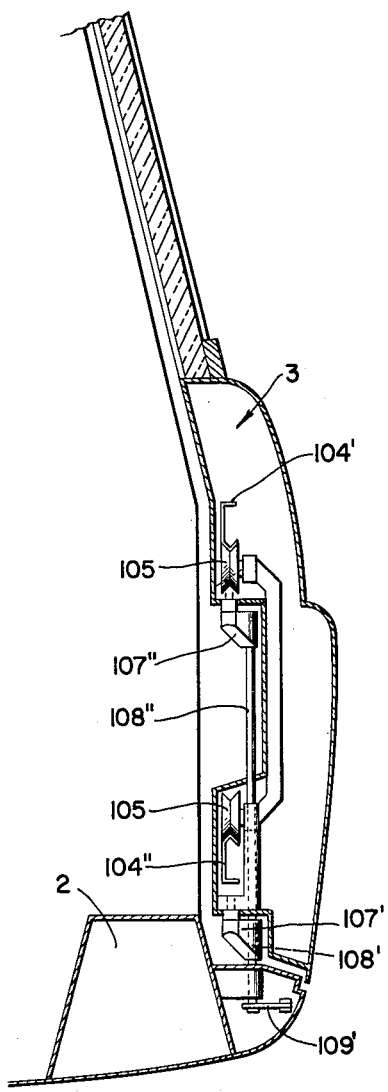

United States Patent Office 3,075,803
Patented Jan. 29, 1963

3,075,803
SLIDABLE DOOR IN MOTOR VEHICLES
Karl Wilfert, Stuttgart-Degerloch, Germany, assignor to Daimler-Benz Aktiengesellschaft, Stuttgart-Unterturkheim, Germany
Filed Aug. 10, 1959, Ser. No. 832,670
Claims priority, application Germany Aug. 16, 1958
4 Claims. (Cl. 296—46)

The present invention relates to a slidable door arrangement, especially in motor vehicles provided with a resilient seal between the door and the vehicle superstructure of the type disclosed in the co-pending application Ser. No. 798,882, filed March 12, 1959, in the name of Bela Barenyi, entitled "Slidable Door Arrangement in Motor Vehicles" and assigned to the assignee of the present application.

The aforementioned co-pending application relates to a slidable door arrangement of the type mentioned hereinabove in which the door opening thereof is at first lifted away from the vehicle superstructure essentially transversely to the plane of the door aperture thereof into an intermediate position and is thereupon displaced from this intermediate position in the longitudinal direction of the vehicle into the fully opened position thereof. The door is thereby supported by means of a support arm adapted to be pivoted about an essentially horizontal axis.

This type of slidable door arrangement as disclosed in the aforementioned co-pending application is further improved by the present invention by rendering the support means of the door pivotal about an at least approximately vertically extending axis.

By a constructiaon of a door arrangement in accordance with the present invention, the movement of the door opening during opening and closing thereof is rendered uniform or even in an advantageous manner by the fact that the direction of the longitudinal sliding movement of the door extends essentially tangentially to the pivotal movement thereof and that both directions of the movements, i.e. the pivotal and horizontal movements, thereby pass over directly into one another. During closure of the door, the construction according to the present invention offers the advantage that the door may be brought into the closed position thereof with momentum, i.e. by applying a force thereto which can be utilized effectively for effecting both the sliding and pivotal movement of the door.

The slidable door arrangement according to the present invention may be appropriately so constructed that the support arrangement of the door consists of two support arms disposed parallel to each other and located one above the other with a predetermined distance from each other. Each arm may thereby be supported about its own pivot axis which axes are arranged parallel to each other. Furthermore, both arms may be connected with each other so as to be operable in unison by the fact that they are securely fastened to the respective pivot pins or pivot shafts thereof and that each pivot pin or pivot shaft carries a crank type-member rotating in unison therewith which in turn are connected with each other by means of a coupling member or link.

The combination of the support arrangement with the sliding arrangement of the door may be advantageously so constructed that at least the lower guide members of the rectilinear guide means for the door are disposed between the two support arms of the support arrangement which support arms are appropriately supported by means of longitudinal and transverse bearings at the vehicle superstructure such as the frame, chassis or vehicle body of a self-supporting-type body of a motor vehicle. In connection therewith, a longitudinal bearing may be provided for each of the lower ends of pivot pins or shafts of the support arms and a transverse bearing for each of the upper ends thereof. At least one bearing support or bearing bracket for each shaft may be arranged at the vehicle superstructure for the support of the pivot pins or pivot shafts, and the longitudinal and cross bearings of the support arms may possibly be combined therein. The longitudinal and/or transverse bearings for the support arms may thereby be constructed in any suitable manner, for example, as shown and described in the aforementioned co-pending Ser. No. 798,882 or as shown and described in the co-pending application Ser. No. 812,403, filed May 11, 1959, in the name of Bela Barenyi and entitled "Motor Vehicle Door Construction," also assigned to the assignee of the present application, the subject matter of these two co-pending applications being incorporated herein by reference insofar as necessary.

According to the present invention, the support arrangement of the slidable door may be so arranged that the pivot shafts or axes of the support arms are disposed within the vehicle interior space in front of the door with the door closed and the support arms extend with the ends thereof facing the door into the interior of the door wall structure. Possibly the entire support arrangement may also be disposed, with a closed door, within the door wall structure, and an appropriate recess or indentation may be provided therefor within the door wall structure. Particularly in the latter case, the support arrangement bears some similarity in its ultimate function to prior art door hinges for vehicle doors constructed as so-called wing-type doors. In a similar manner as in these wing-type vehicle doors, the support installation for the slidable door arrangement according to the present invention may be advantageously arranged at one end of the door aperture and the door handle at the opposite end thereof.

Accordingly, it is an object of the present invention to provide a slidable door arrangement which further improves the existing slidable door arrangements known in the prior art by improving the door-movement action during opening and closing thereof.

Another object of the present invention resides in the provision of a slidable door arrangement in which the support for the door is so arranged and constructed that the two movements of the door consisting of a pivotal movement essentially transversely to the plane of the door aperture and a sliding movement essentially parallel to the door aperture may pass over directly into one another.

Still another object of the present invention is the provision of a door support installation for slidable doors in which the force applied to the door, for example, during closing thereof is effective not only to cause the sliding movement of the door but also, if of sufficient strength, to produce the swinging movement of the door into the door aperture in a direction essentially perpendicularly to the plane of the door aperture after completion of the sliding movements of the door.

These and other objects, features and advantages of the present invention will become more obvious from the following description when taken in connection with the accompanying drawing which shows, for purposes of illustration only, two embodiments in accordance with the present invention and wherein FIGURE 1 is a side elevational view of the inside of the vehicle door provided with a slidable door arrangement in accordance with the present invention, FIGURE 2 is a cross-sectional view through the door aperture taken approximately at the height of line 2—2 of FIGURE 1 and showing the door aperture as well as the slidable door arrangement and door support installation in accordance with the present invention and a portion of the door in the fully opened position thereof, FIGURE 3 is a vertical cross-sectional view, on an enlarged scale, taken along line 3—3 of FIGURE 1, FIGURE 4 is a side elevational view of the inside of a vehicle door provided with a modified embodiment of a slidable door arrangement in accordance with the present invention, FIGURE 5 is a cross-sectional view taken along approximately at the height of line 5—5 of FIGURE 4 through the door aperture showing the door aperture, the support and guide arrangement for the slidable door in accordance with the present invention and a portion of the slidable door in the fully opened position thereof, and FIGURE 6 is a cross-sectional view, on an enlarged scale taken along line 6—6 of FIGURE 4.

Referring now to the drawing wherein like reference numerals are used throughout the various views to designate like parts, and more particularly to FIGURES 1 to 3, reference numeral 1 designates therein the vehicle superstructure of a motor vehicle, especially of a passenger motor vehicle which may be of any suitable construction. The term vehicle superstructure is used herein as a generic broad term referring to a vehicle frame or chassis and/or a vehicle body, for example, of a self-supporting type vehicle body.

In the embodiment illustrated in FIGURES 1 to 3, the vehicle superstructure 1 includes a longitudinal bearer member 2 of any suitable construction and a door generally designated by reference numeral 3. A guide rail 4 of any suitable construction is provided within the door 1 along the inside thereof and approximately at half height thereof. Guide members in the form of individual roller members 5 or ball-type members arranged in pairs or groups thereof are adapted to be guidingly displaced along the guide rail 4. In the embodiments of the present application as illustrated in the drawing, the roller members 5 are rotatably supported on a support or carriage member 6 of any suitable construction. In the embodiment illustrated in FIGURES 1 to 3, the pairs of roller members 5 enclose therebetween the guide rail 4 so that the upper and lower roller members 5 move along the upper and lower guide surface of guide rail 4 (FIGURES 1 and 3).

The carriage or support member 6 of the roller-type guide members 5 is pivotally connected with a support arrangement generally designated by reference numeral 7 whereby the pivot axis thereof extends at least approximately vertically. The support installation for the door essentially consists of a lower support arm 7' and of an upper support arm 7" which are securely mounted on pivot shafts 8' and 8" respectively extending approximately vertically for common movement therewith. The pivot pins or pivot shafts 8' and 8" are each provided at the lower end thereof with a crank arm 9' and 9" which in turn are connected with each other by a link 10 pivotally secured to the outer ends of each crank arm 9' and 9".

In the embodiment according to FIGURES 1 to 3, the lower support arm 7' is disposed below the support carriage 6 and the upper support arm 7" above the support carriage 6. The lower arm 7' is pivotally mounted within a bearing support 11 mounted on and suitably secured to the longitudinal bearer member 2. A bearing support 12 for the upper support arm 7" is arranged at a vertical bearer member 1' of the vehicle superstructure 1. The pivot shaft 8" of the upper support arm 7" is journaled with the lower end thereof in a pivot or thrust bearing 13 formed within the longitudinal bearer member 2. The two bearing supports 11 and 12 are thereby so arranged that with the door 3 closed they are disposed within the vehicle superstructure in front of the door wall structure and the support arms 7' and 7" extend, with the ends thereof facing the door 3, into the wall structure thereof.

In the embodiment according to FIGURES 4 to 6 in which corresponding reference numerals of the 100 series are used to designate parts corresponding to those of FIGURES 1 to 3, the door is again generally designated by reference numeral 3 while the vehicle superstructure generally designated again by reference numeral 1 also includes again a longitudinal bearer member 2. The guide members which may again be in the form of roller members 105 or analogous roller-type elements arranged in pairs or groups of suitable numbers are again rotatably supported on a support member or carriage 106. Instead of a single guide rail having upper and lower guide surfaces, the embodiment of FIGURES 4 through 6 is provided with two guide rails 104' and 104" spaced from each other in the vertical direction and disposed within the slidable door. The pairs of guide roller member 105 are thereby disposed in the embodiment of FIGURES 4 through 6 between the individual guide rails 104' and 104" so that the upper guide roller members 105 engage the lower surface of the guide rail 104' whereas the lower guide roller members 105 rest against the upper surface of the guide rail 104".

The pivot shaft 108' of the lower support arm 107' of the support installation of this embodiment is thereby pivotally supported in a bearing support 114' arranged at the longitudinal bearer member 2. For purposes of pivotally supporting the second pivot shaft 108" for the upper support arm 107", a bearing support 114" is arranged at the longitudinal bearer member 2 and a second bearing support 115 is provided directly below the upper support arm 107" at a vertical bearer member 1' of the vehicle superstructure 1.

The construction of the embodiment of FIGURES 4 through 6 distinguishes itself from the embodiment of FIGURES 1 through 3 essentially by the fact that the portions of the support installation located above the bearer member 2 are disposed, with the door closed, within a recess provided in the wall structure of the door and that, therefore, in this position, no parts projecting into the vehicle interior space are present in this construction. By reason of the relatively larger distance of the roller members 105 of each pair of roller members from one another, the upper support arm 107" of this embodiment is pivotally secured at the support member or carriage 106 intermediate the pairs of vertically spaced rollers 105.

During opening and closing of the door 3, the latter is seized at the handle 16 thereof which is arranged at the end of the door 3 opposite to the end near which is found the support installation thereof.

During opening, the door 3 is at first lifted out of the door aperture into an intermediate position whereby the door 3 is pivoted at both support arms 7' and 7" or 107' and 107" about the two pivot shafts 8' and 8" or 108' and 108", on the one hand, and about the two pivotal supports of the support arms 7' and 7" or 107' and 107" at the support member or carriage 6 or 106, respectively, on the other. After attaining the intermediate position in which position the support arms 7' and 7" or 107' and 107" appropriately abut against suitable stop means each (not shown) and may also be elastically locked by any suitable spring-loaded locking or detent means, the pivotal movement of the door passes over into a sliding movement thereof, in which the door 3 is displaced with respect to the relatively stationary carriage support 6 or 106 along guide rails 4 or 104' and 104" essentially rectilinearly into the fully opened position thereof shown in FIGURES 2 and 5.

In order to prevent the displacement of the door prior to the conclusion of the pivoting or swiveling movement, it is possible to provide either elastic stop means between the carriage and its guide, or recesses within the guide tracks to be engaged by the guide rollers.

During closure of the door the reverse movement takes place. At first the door 3 is moved rectilinearly into the intermediate position thereof and thereupon without abrupt change in the direction of movement is pivoted into the closed position thereof.

Thus, the slidable door arrangement according to the present invention enables the two movements consisting of pivotal and sliding movement to pass over directly from one into the other in a smooth and uninterrupted manner.

As pointed out hereinabove, the support arms 7' and 7" or 107' and 107" are each suitably supported at the vehicle superstructure 1 by means of appropriately constructed longitudinal and transverse bearings. The longitudinal bearings may thereby be arranged, for instance, at the lower ends of shafts 8' and 8" or 108' and 108" and the transverse bearings at the upper ends 8' and 8" or 108' and 108". In the alternative, the longitudinal and transverse bearings may be combined, for instance, into a bearing assembly of suitable construction housed or supported in bearing supports 11 and 12 or 114 and 114' or 115.

The terms "longitudinal" and "transverse" bearings are used herein to designate any suitable bearings of known construction which support the respective shafts in the longitudinal or axial direction thereof and in the transverse or radial direction thereof, respectively. For example, normal thrust bearings of any known construction may be used as longitudinal bearings while ordinary radial bearings may be used for the transverse bearings.

While I have shown and described two embodiments in accordance with the present invention, it is understood that the same is not limited thereto but is susceptible of many changes and modifications within the spirit and scope of the present invention and I, therefore, do not wish to be limited to the details shown and described herein but intend to cover all such changes and modifications as are encompassed by the scope of the appended claims.

I claim:

1. A slidable door arrangement, particularly for motor vehicles having a vehicle superstructure and a door normally closing the door aperture provided therefor in the vehicle, comprising support means for said door including two commonly actuable approximately horizontal support arms disposed essentially parallel to each other and vertically spaced to support said slidable door at said superstructure, pivot means for said support arms including two approximately vertical and parallel pivot shafts spaced from each other in the longitudinal direction of the vehicle and located adjacent one side of said door aperture, rectilinear guide means including guide rail means secured to said door, guide rollers engaging said guide rail means, carriage means for said guide rollers operatively connecting said support arms with said door, and means including said support arms and said pivot means to provide a first movement of said door during opening thereof essentially out of the plane of said door aperture and to thereupon provide a second movement of said door in the longitudinal direction of the vehicle.

2. A slidable door arrangement according to claim 1, wherein the support arms are disposed within a recess provided in the door wall structure with the door thereof in the closed position.

3. A slidable door arrangement, particularly for motor vehicles having a vehicle superstructure and a door normally closing the door aperture provided therefor in the vehicle, comprising support means for said door including two support arms disposed essentially parallel to each other and spaced one above the other to support said slidable door at said superstructure, and connecting means including approximately vertical pivot means operatively connecting said two support arms with said vehicle superstructure and with said door to enable a first movement of said door during opening thereof essentially out of the plane of said door aperture and to thereupon provide a second movement of said door in the longitudinal direction of the vehicle, said approximately vertical pivot means including a pivot shaft for each support arm, each pivot shaft being spaced from the other in the longitudinal direction of the vehicle adjacent one side of the door aperture, means interconnecting said pivot shafts, said connecting means further including a guide rail having upper and lower vertically spaced guide surfaces secured to said door and guide roller members connected to said support arms with at least one pair of guide roller members operatively movable upon each of said guide surfaces.

4. A slidable door arrangement, particularly for motor vehicles having a vehicle superstructure and a door normally closing the door aperture provided therefor in said vehicle, comprising support means for said slidable door including two vertically spaced essentially horizontal support arms, each support arm being provided with an essentially vertical pivot shaft, said shafts being substantially parallel and spaced from each other in the longitudinal direction of the vehicle, each pivot shaft including a crank member, means operatively connecting said two crank members with each other, rectilinear guide means secured to said door, said support arms being provided with complementary guide means operatively engaging said guide means secured to said door, and bearing means for said pivot shafts whereby said door is operative to carry out a first movement during opening thereof essentially out of the plane of said door aperture and to thereupon carry out a second movement in the longitudinal direction of the vehicle.

References Cited in the file of this patent

UNITED STATES PATENTS

| 2,956,836 | James | Oct. 18, 1960 |

FOREIGN PATENTS

| 698,436 | France | Nov. 18, 1930 |
| 990,126 | France | June 6, 1951 |
| 389,061 | Great Britain | of 1933 |
| 452,679 | Great Britain | Aug. 27, 1936 |
| 738,486 | Great Britain | Oct. 12, 1955 |